UNITED STATES PATENT OFFICE.

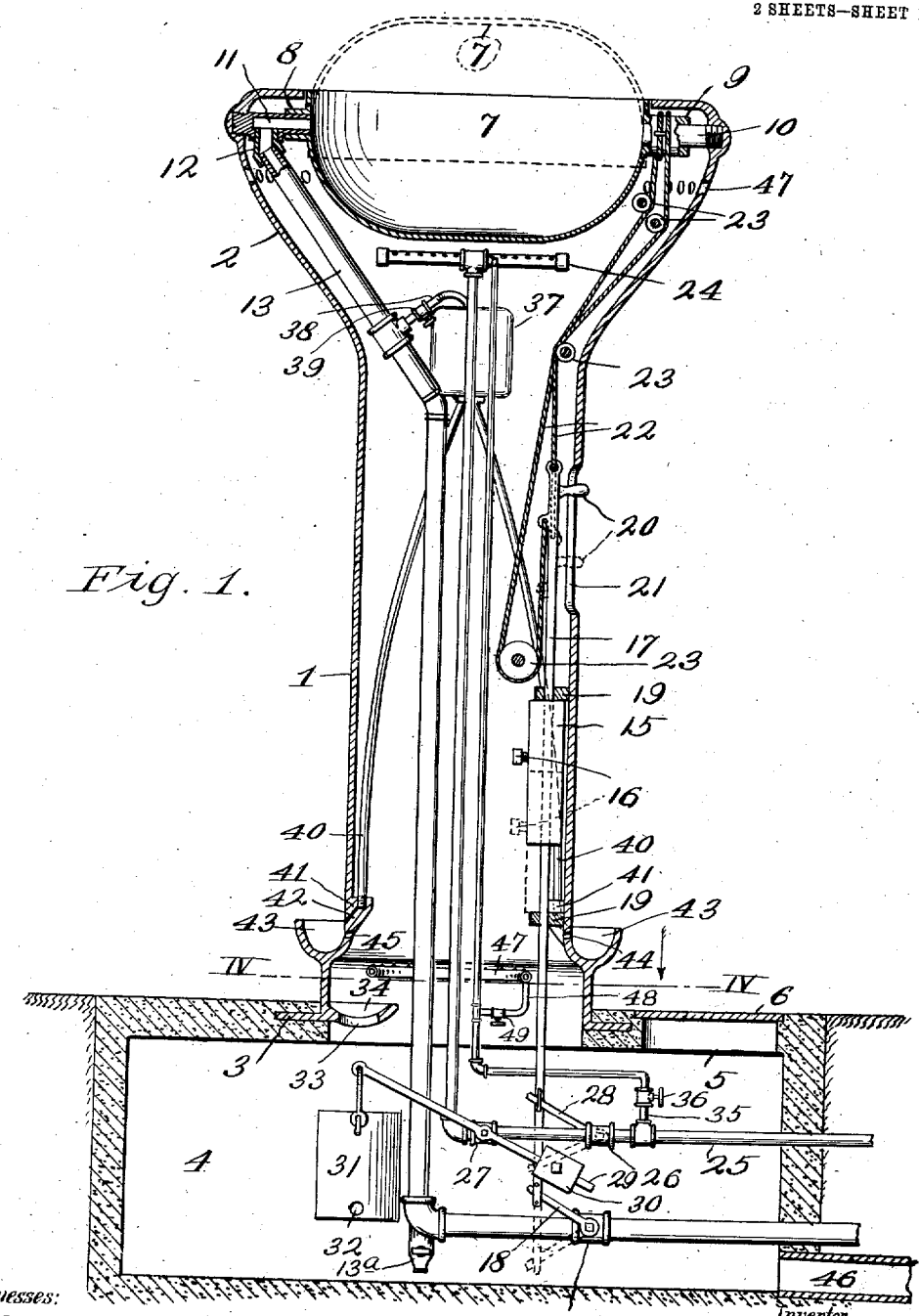

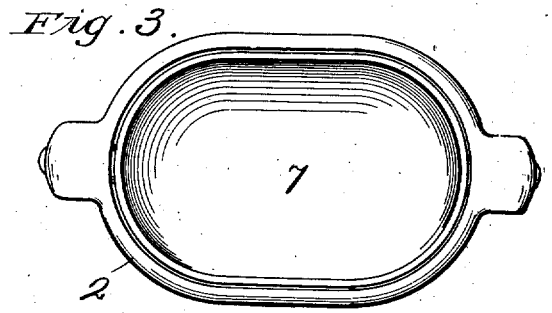
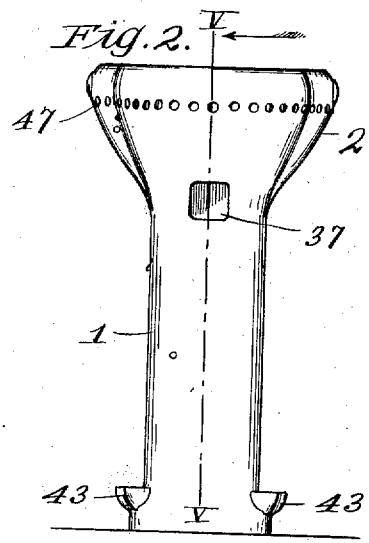
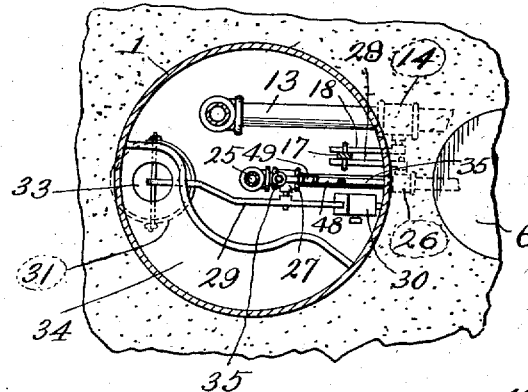

ATVILL BYRD, OF KANSAS CITY, MISSOURI.

SANITARY DRINKING-FOUNTAIN.

1,019,881.  Specification of Letters Patent.  Patented Mar. 12, 1912.

Application filed May 15, 1911. Serial No. 627,295.

*To all whom it may concern:*

Be it known that I, ATVILL BYRD, a citizen of the United States, residing at Kansas City, in the county of Jackson and State of Missouri, have invented certain new and useful Improvements in Sanitary Drinking-Fountains, of which the following is a specification.

My invention relates to sanitary drinking fountains for horses and other quadrupeds, and my principal object is to provide a fountain which can be safely used on public thoroughfares without danger of spreading contagious diseases, such as glanders, etc., common to equines.

The public drinking fountain as ordinarily arranged, constitutes a source of danger in the dissemination of contagious diseases, due to diseased animals rubbing their noses on the basin of the fountain, and depositing mucus thereon which may be taken into the system of animals subsequently drinking at the fountain. I avoid this danger by providing means whereby the basin of the fountain is automatically tipped to empty the water therefrom, and means whereby said basin is sterilized after each animal has drank therefrom, thus effectually destroying all germs and keeping the basin in a thorough sanitary condition.

In the accompanying drawings which illustrate the invention: Figure 1 shows a vertical section of my improved fountain. Fig. 2 is an elevation of the fountain. Fig. 3 is a plan view of the fountain. Figs. 4 and 5 are sections taken on lines IV—IV and V—V of Figs. 1 and 2, respectively.

In carrying out the invention I employ a casing 1, having a flaring upper portion 2, and a marginal flange 3 at its lower end, which may be embedded in the top of a pit 4, arranged beneath the fountain and to which access may be had through a manhole 5, normally covered by a lid 6.

7 designates a basin adapted to hold the drinking water, said basin being preferably oval shape in plan view, and provided at one end with a hollow hub 8, and at its opposite end with a drum 9, which latter is journaled upon a stub-shaft 10, firmly secured to the adjacent end of the enlarged portion 2 of the casing 1. Hub 8 is journaled upon a tubular stub-shaft 11, firmly secured to the adjacent enlarged portion 2 of the casing 1, and provided with a nipple 12 for connection with the upper end of a water supply-pipe 13, which passes down through casing 1 into pit 4, from which it extends to the city water main, or other source of supply. Supply-pipe 13 is provided at its lower portion with a pet-cock 13$^a$, so that it may be drained of water in cold weather.

The flow of water through supply-pipe 13 is controlled by a valve 14, which is automatically closed by a counter-weight 15, secured by a set-screw 16, to a connecting-rod 17, extending down into the pit, and connected to the lever 18 of valve 14. Connecting-rod 17 passes through a pair of stops 19, secured to the adjacent interior portion of casing 1, to limit the vertical movement of the counter-weight 15. Connecting-rod 17 is provided at its upper end with a handle 20, projecting through an elongated opening 21 in casing 1, so that access may be readily had to said handle.

Basin 7, which is adapted to turn up-side-down, or to the dotted position shown in Fig. 1, is controlled through the intermediacy of the connecting-rod 17, and a cable 22, which is given one or more turns around the drum 9, and attached at its end to eyes at the upper portion of the connecting-rod, said cable being guided between the drum and the connecting-rod by suitable sheaves 23.

When the basin is in the inverted position shown by the dotted lines, Fig. 1, it is sterilized by a flame issuing from a burner 24, supplied with gas through a supply-pipe 25, pasing downward through casing 1, and out through pit 4 to the city gas main, or other source of supply. The flow of gas through supply-pipe 25 is controlled by a valve 29 with its lever 28 and by a safety-valve 27, the former of which is actuated by the connecting-rod 17 to which its lever 28 is operably-connected.

Valve 27, which is automatically controlled, has a lever 29, provided at one end with a counter-weight 30, and at its opposite end with a suspended receptacle 31, having at its lower portion a discharge orifice 32.

Receptacle 31 is arranged immediately beneath the discharge opening 33 of a gutter 34, extending partly around the interior lower portion of casing 1, and adapted to catch the water discharged from basin 7 when the same is inverted.

When gas is admitted to burner 24, it is ignited by a pilot-light supplied with gas through a tube 35, communicating with the supply-pipe 25, and provided with a valve 36, so that the pilot-light may be extinguished when desired.

37 designates a small compartment in the upper portion of casing 1, to receive a cup or other receptacle whereby a teamster may obtain a drink when watering his team. Said compartment is supplied with water through a small branch-pipe 38, leading from the water supply-pipe 13, and provided with a valve 39, so that the flow of water therethrough may be shut off. All water discharged from branch-pipe 38 falling upon the bottom of compartment 37 is carried therefrom through drain-pipes 40, leading down to lugs 41, having ducts 42 communicating with small troughs 43 at opposite sides of the fountain for the purpose of watering canines and felines, the overflow from one of said troughs passing downward into pit 4 through an orifice 44, and the overflow from the other trough passing down into gutter 34 from an overflow orifice 45. The overflow from troughs 43 eventually escapes from the pit through a pipe 46 leading preferably to a sewer, not shown.

A burner 47 is provided at the interior lower portion of the fountain to prevent the water emptied from basin 7, from freezing in the pipes and the interior of the fountain during cold weather. Burner 47 communicates with the pilot-tube 35 through a branch-pipe 48, provided with a valve 49, so that gas to said burner may be cut off when desired.

Basin 7 is normally held in the inverted position shown by dotted lines, Fig. 1, through the intermediacy of counterweight 15 and the connecting parts. When the teamster desires to water his team, he grasps handle 20 and pulls it upward until counterweight 15 engages the uppermost stop 19. This upward movement of the handle turns the basin a half revolution to the position shown in full lines, Fig. 1, closes valve 28, and opens valve 14. The opening of valve 14 permits the water to flow upward through supply-pipe 13, into basin 7, and into compartment 37 through the branch-pipe 38, from which a portion of the water flows downward through drain-pipes 40 and fills the troughs 43. After the team has been supplied with water, handle 20 is released, so that it can be carried downward by counterweight 15, until the same strikes against the lowermost stop 19. The downward movement of the handle closes valve 14 and opens the safety gas valve 26. Said downward movement also inverts the basin, causing it to discharge the water therefrom, which flows down one side of the interior of casing 1, and into the gutter 34, from which it is discharged into receptacle 31 through the opening 33 in the gutter. The flow of water into receptacle 31 causes the same to move downward and open valve 27, so that gas may flow therethrough to burner 24, where it is ignited by the pilot-light. The flame thus created impinges against the inverted basin and thoroughly sterilizes the same, destroying any germs which may have been deposited thereon by diseased animals. The flame at burner 24 continues to burn until sufficient water has discharged from the orifice 32 of receptacle 31 to permit counterweight 30 to lift said receptacle and close valve 27, when further supply of gas to burner 34 is cut off. The products of combustion caused by the flame of burner 24, escapes through orifices 47 in the enlarged upper portion 2 of casing 1.

While it is preferable to sterilize the basin in the manner above described, this precaution may be omitted, and the burner 24, the pilot-tube 35, and the gas supply-pipe 25, dispensed with, as I find that emptying the basin of water after each animal has drunk therefrom, usually carries away any germs which may be deposited in the basin.

Having thus described my invention, what I claim, and desire to secure by Letters Patent, is:

1. A drinking fountain, consisting of a basin operably-mounted, means to supply said basin with water, and automatic means to invert the basin and cut off the supply of water thereto.

2. A drinking fountain consisting of a basin operably-mounted, means to supply said basin with water, a cable to turn said basin to an operative or inoperative position, a valve to cut off the supply of water to said basin, and a connecting-rod connecting the cable and said valve.

3. A drinking fountain consisting of a basin operably-mounted, means to supply said basin with water, a cable to turn said basin to an operative or inoperative position, a valve to cut off the supply of water, a connecting-rod connecting the cable and said valve, a handle on said connecting-rod to move the same in one direction, and means to automatically move said connecting-rod in a reverse direction.

4. A drinking fountain, consisting of a casing having a compartment at the upper portion thereof, and troughs at the lower portion thereof, communicating with said compartment, a basin operably-mounted in the upper portion of said casing, means to supply said basin and the compartment with water, and means to automatically turn the basin to empty the water therein.

5. A drinking fountain, consisting of a basin, and heating means for sterilizing said basin.

6. A drinking fountain, consisting of a basin, means for supplying said basin with water, a burner for sterilizing said basin, a gas supply-pipe leading to said burner, and a valve to control the flow of gas through said supply-pipe.

7. A drinking fountain, consisting of a basin, means for supplying said basin with water, a burner for sterilizing said basin, a gas supply-pipe leading to said burner, a self-closing valve to control the flow of gas through said supply-pipe, and means controlled by water discharged from the basin for opening said valve.

8. A drinking fountain, consisting of a basin, means for supplying said basin with water, a burner for sterilizing said basin, a gas supply-pipe leading to said burner, a valve to control the flow of gas through said pipe, means controlled by water discharged from the basin for opening said valve, and a pilot-light adjacent said burner.

9. A drinking fountain, consisting of a basin, means for supplying said basin with water, a receptacle to catch water discharged from the basin, said receptacle having an orifice to allow the water to flow slowly therefrom, a self-closing valve adapted to be opened by the receptacle when loaded with water, a gas supply-pipe through which the flow of gas is controlled by said self-closing valve, and a burner communicating with said gas supply-pipe and located adjacent the basin to sterilize the same.

10. A drinking fountain, consisting of a basin operably-mounted, means for supplying said basin with water, means for turning said basin to empty the water therefrom, a receptacle, a gutter to collect and discharge the water from the basin into said receptacle, a self-closing valve adapted to be opened by the receptacle when loaded with water, a gas supply-pipe through which the flow of gas is controlled by said self-closing valve, and a burner communicating with said gas supply-pipe and located adjacent the basin to sterilize the same.

11. A drinking fountain, consisting of a basin operably-mounted, a burner to sterilize said basin, a gas supply-pipe leading to said burner, a self-closing valve to control the flow of gas through said supply-pipe, a supply-pipe to supply said basin with water, a valve to control the flow of water through said supply-pipe, means to turn the basin to operative position and open the valve of the water supply-pipe, a counter-weight to turn the basin to empty the water thereof, and means for catching the water emptied from the basin and to open the self-closing valve on the gas supply-pipe.

12. A drinking fountain, consisting of a basin, means for supplying said basin with water, a burner for sterilizing said basin, a gas supply-pipe leading to said burner, a self-closing valve to control the flow of gas through said pipe, a safety-valve to also control the flow of gas through the supply-pipe, a valve to control the flow of water to the basin, and means connecting the last-mentioned valve and the safety-gas valve to simultaneously actuate the same.

13. A drinking fountain, consisting of a basin operably-mounted, a casing containing said basin, a supply-pipe to supply said basin with water, means for inverting said basin to empty the water therefrom into the casing, means to conduct the discharged water away from the fountain, and a burner at the lower interior portion of the casing to prevent the water discharged from the basin from freezing within the casing.

In testimony whereof I affix my signature, in the presence of two witnesses.

ATVILL BYRD.

Witnesses:
F. G. Fischer,
E. C. Lillian.

---

Copies of this patent may be obtained for five cents each, by addressing the "Commissioner of Patents, Washington, D. C."